United States Patent
Robins et al.

(10) Patent No.: US 7,023,110 B2
(45) Date of Patent: Apr. 4, 2006

(54) APPARATUS AND METHOD UTILIZING AN AC ADAPTOR PORT FOR EVENT TRIGGERING

(75) Inventors: Mark N. Robins, Greeley, CO (US); Heather N Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1089 days.

(21) Appl. No.: 09/925,777

(22) Filed: Aug. 9, 2001

(65) Prior Publication Data

US 2003/0030465 A1 Feb. 13, 2003

(51) Int. Cl.
*H02J 1/00* (2006.01)

(52) U.S. Cl. .......................................... 307/85; 307/86

(58) Field of Classification Search ................ 307/85, 307/86

See application file for complete search history.

*Primary Examiner*—Robert L. Deberadinis (57) ABSTRACT

An apparatus and method for event triggering an electronic device utilize an AC adaptor port as a trigger source interface port. The apparatus for triggering the device comprises an AC adaptor port, a mode control element, and an event monitor. While in a trigger mode, the AC adaptor port is the trigger source interface port and, while not in trigger mode, the AC adaptor port is a power source port. The method of triggering comprises the steps of setting a mode of operation, wherein trigger mode is either enabled or disabled, and while trigger mode is enabled, monitoring a parameter of a signal applied to the AC adaptor port, comparing the parameter to a threshold to determine if a trigger event has occurred, and if so, triggering the device to perform an action.

29 Claims, 5 Drawing Sheets

APPARATUS AND METHOD UTILIZING AN AC ADAPTOR PORT FOR EVENT TRIGGERING

TECHNICAL FIELD

The invention relates to a triggerable electronic device. In particular, the invention relates to triggering the device using events external to the device.

BACKGROUND OF THE INVENTION

Event triggering of electronic devices is useful in a number of different applications. Examples of event triggered or event driven devices include, but are not limited to, cameras (film or digital), video cameras, and tape recorders. As used herein, the term 'event triggering' is defined as 'causing a device to perform a given operation, action, task, or function in response to the occurrence of an event, the event generally being representative of a state or condition of an environment external to the device'. Examples of external environmental states that are used as event triggers include, but are not limited to, temperature, wind speed, vibration, motion, and illumination intensity. Often, the external state is monitored using a sensor. The sensor monitors the external state (e.g. temperature, vibration, wind speed, etc.) and communicates the condition to the device using a signal parameter such as voltage. The sensor is interfaced to the event triggered device using a dedicated trigger source interface port. To explore the concept of event triggered devices a bit further, consider a digital camera.

Digital cameras that record images in a digital representation are rapidly gaining on conventional photographic film based cameras in both popularity and performance. In particular, the performance of digital cameras in terms of image quality/resolution, image recording speed, and ability to capture images in variable lighting condition has made dramatic improvements in the last decade. At the same time, improvements in memory technology for storing and transporting digital images along with advances in color image printing technologies have complemented the improvements in digital cameras. Moreover, the cost of digital cameras, memory and color image printers are decreasing rapidly. The combination of improved performance and reduced costs has resulted in the application of digital cameras to a wide variety of tasks including those tasks employing event triggering.

For example, a digital camera may be used to record an image of an integrated circuit or other article of manufacture undergoing temperature testing. The camera can record images at one or more specific temperatures. A temperature sensor monitors the temperature and produces a voltage that corresponds to the monitored temperature. An image is recorded when a specific, predetermined temperature is detected by the temperature sensor or equivalently when a specific predetermined voltage is detected by the camera at the trigger source interface port. In another application, a motion detector can monitor an area for the presence of an individual. When an individual enters the area, the motion detector triggers the camera that records an image of the individual. The trigger in this case is often a pulse or step function in the voltage applied to the dedicated interface port of the camera.

A problem with using most digital cameras and, for that matter, many other devices for event triggered applications is the lack of a dedicated trigger source interface port. Without the dedicated trigger source interface port, these conventional devices cannot be triggered by an external event. Most devices lack a dedicated trigger source interface port in part due to a shortage of real estate on a housing that encloses the device. The real estate shortage makes it difficult or impossible to incorporate a specialized connector to serve as the dedicated trigger source interface port. In practice, extensive and expensive redesign of an existing device is required to introduce event-triggered functionality. This extensive redesign tends to make the device prohibitively expensive and thus relegates the device to a class of highly specialized devices that have dedicated trigger source interface ports and event triggering functionality.

Accordingly it would be advantageous to be able to trigger an electronic device to perform a function or an action by an event external to the device without requiring a dedicated trigger source interface port.

SUMMARY OF THE INVENTION

The present invention is an apparatus and a method for triggering a device in response to an event that utilizes an existing power supply or AC adaptor port on the device as a trigger source interface port. The present invention is also an electronic device that incorporates the apparatus and method. The novel 'dual-use' of the existing AC adaptor port according to the present invention eliminates the need for a specialized trigger source interface port. The dual-use of the AC adaptor port according to the present invention is particularly attractive for devices, such as digital cameras, in which available housing real estate is at a premium. Moreover, the method and apparatus of the present invention can utilize or take advantage of existing power supply monitoring hardware of the device in many situations. Advantageously in these situations, the method and apparatus often can be realized as a software or firmware upgrade to an existing device obviating the need for a new hardware design.

In one aspect of the invention, an apparatus for triggering a device is provided. The apparatus comprises an AC adaptor port, a mode control element, and an event monitor. The AC adaptor port is connected to an input of the mode control element and to the event monitor. The apparatus may further comprise a power supply that is connected to an output of the mode control element. Optionally, the apparatus may further comprise a battery connected to the power supply.

The apparatus has two operational modes: trigger mode and non-trigger mode. Viewed another way, the apparatus has a trigger mode that can be either enabled or disabled. While the trigger mode is disabled, the mode control element electrically connects the AC adaptor port to the power supply. While the trigger mode is enabled, the mode control element electrically isolates the AC adaptor port from the power supply. Also while in trigger mode, the event monitor monitors a parameter of a signal applied to the AC adaptor port from an external trigger source. Upon detection of a predefined trigger event, the event monitor signals the device which then performs a function. Thus, the apparatus provides for a novel dual-use of the AC adaptor port as either a source of power or as a trigger source interface port.

In another aspect of the invention, a method of triggering an operation or action by a device having an AC adaptor port is provided. The method results in the dual use of the AC adaptor port as a power supply port and as a trigger source interface port. The method of triggering comprises the steps of setting a mode of operation. The mode of operation is either a trigger mode or a non trigger mode. If the trigger mode is set, the method further comprises the step of monitoring a parameter of a signal applied to the AC adaptor port. During the step of monitoring, an event may be detected, such that the method further comprises the step of triggering an action by the device.

In another aspect of the invention, an electronic device having an event-triggered mode is provided. The device comprises an AC adaptor port, a trigger mode and a non trigger mode. The device of the present invention shares the use of the AC adaptor port between serving as a source of power for operating the device and/or charging internal re-chargeable batteries and serving as a trigger source interface port. When in the trigger mode, the device monitors the AC adaptor port for a trigger event. Upon recognizing the trigger event, the device performs a function or an action. When in the non trigger mode, the AC adaptor port functions in a conventional way as a power supply port to provide power to the device and/or to provide power for charging the re-chargeable batteries of the device. The device may be a camera, such as a digital camera, a tape recorder, video camera, or the like, that performs a function or action, such as recording an image or a sound.

When realized as a digital camera, the device comprises an AC adaptor port, a controller, an imaging subsystem, a memory subsystem, an interface subsystem, a power subsystem, and a control program stored as firmware or software in memory. The controller executes the control program to control the operation of the imaging subsystem, the memory subsystem, the interface subsystem, and the power subsystem. The power subsystem comprises a power supply, a monitor, and one or more batteries. The interface subsystem enables a user of the camera to interact with the camera. In particular, the interface enables the user to control whether or not the camera is operating in the trigger mode, according to the invention. The camera is in the trigger mode when the trigger mode is enabled by the user. One skilled in the art can readily substitute appropriate alternative subsystems for those of the camera to accommodate realizing another device according to the present invention.

When the trigger mode is enabled, the AC adaptor port becomes a trigger source interface port and the monitor monitors a signal applied to the AC adaptor port for the presence of a predetermined parameter value that represents the occurrence of an event. If the predetermined parameter value is detected, the control program initiates an image capturing and recording action by the camera. When in non trigger mode (i.e. trigger mode is disabled by the user), the AC adaptor port is used to provide power to the power supply that, in turn, can be used to charge or re-charge the battery or batteries.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

The present invention is an apparatus for and a method of triggering an electronic device to perform an operation in response to an event external to the device. The electronic device can be any device having a conventional power supply connector or port including, but not limited to, a digital camera, video camera, tape recorder, or digital audio recorder, that is triggered to perform an action, such as recording an image or a sound. When triggered, the device performs some operation or function inherent to the device. For the purposes of simplicity herein, the invention will be described using a digital camera as the electronic device. However, other electronic devices are within the scope of the present invention.

The apparatus and method of the present invention utilize the power supply or AC adaptor port of the device in a novel manner as a trigger source interface port. Prior to the present invention, the AC adaptor port has been used solely as a means of charging an internal battery and/or as a means of providing operational power to the device. Advantageously, the use of the AC adaptor port as a trigger source interface eliminates the need for a dedicated trigger source interface port on the device. Moreover, in many triggerable electronic devices, the method and apparatus can be implemented entirely in software or firmware of the device without the need for hardware modifications.

According to the present invention, the device is placed in a specialized operational mode called a 'trigger mode'. When operating in the trigger mode, the AC adaptor port becomes or serves as the trigger source interface port. An external event, such as a particular voltage level, detected at the AC adaptor port triggers the device to perform an action or function. For example, if the device is a digital camera, the external event may trigger the recording of an image by the camera. Thus, the digital camera can be triggered to record an image, for example, when a sensor detects a predetermined environmental state (e.g. a given temperature) and communicates the presence of that state to the camera via a particular signal voltage. Examples of sensors or uses include, but are not limited to, temperature sensors, strain sensors, vibration sensors, contact switches, light level detectors and motion detectors. One of ordinary skill in the art can readily conceive of additional uses for the event-triggered capability afforded by the apparatus and method of the present invention. All such uses are within the scope of the present invention.

Figure 1:
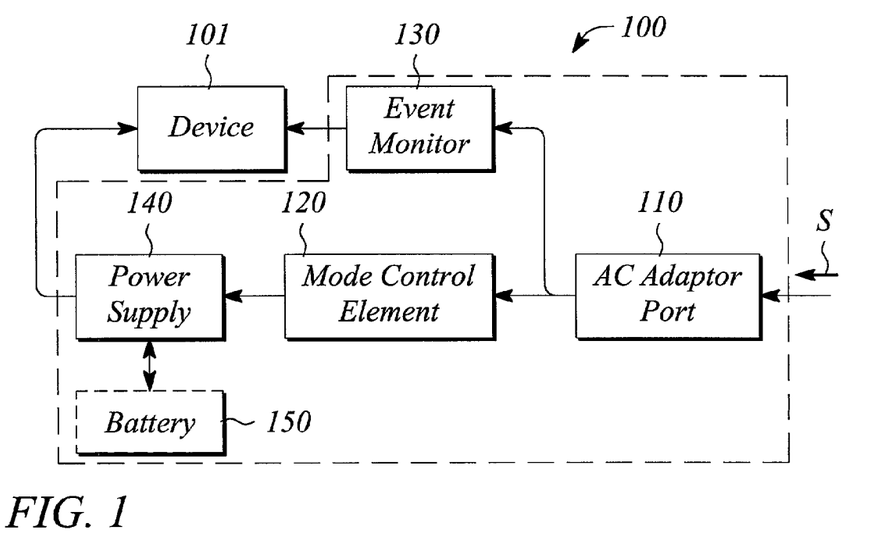
FIG. 1 illustrates a block diagram of an apparatus for triggering a device according to the present invention.

In one aspect of the invention, an apparatus 100 for triggering a device 101 is provided. A block diagram of the apparatus 100 is illustrated in FIG. 1. The apparatus 100 comprises a power supply or AC adaptor port 110, a mode control element 120, and an event monitor 130. The AC adaptor port 110 is connected to an input of the mode control element 120 and to the event monitor 130. The apparatus 100 further comprises a power supply 140 connected to an output of the mode control element 120. Optionally, the apparatus 100 may further comprise a battery 150 connected to the power supply 140.

The AC adaptor port 110 receives a signal S from a source external to the apparatus 100. The signal S is transferred from the AC adaptor port 110 to the mode control element 120. The event monitor 130 monitors a parameter or set of parameters of the signal S received from the external source. The monitored signal parameters may include, but are not limited to, a voltage V, a current I, or a frequency f of the signal S. The event monitor 130 has an output that is connected to the device 101. The event monitor 130 produces an output signal $S_{monitor}$ that can trigger an action or function of the device 101. The power supply 140 may supply either some or all of the operational power for the device 101.

During operation, the apparatus 100 and associated device 101 can be either in a trigger mode or a non trigger mode. The trigger mode can be initiated by applying a TRIGGER command to the mode control element 120. The TRIGGER command may be produced by the device 101 or may be applied by an external source. Alternatively, the trigger mode can be initiated by simply changing the way the device 101 'interprets' the output signal $S_{monitor}$ of the event monitor 130. Thus, the device 101 receives the output signal $S_{monitor}$ and decides or interprets whether or not it represents a trigger signal based on whether or not the apparatus 100 and device 101 are in the trigger mode. In the former case where the TRIGGER command is applied, the mode control element 120 is considered to be an 'active' element meaning that the mode control element 120 actively changes its operational condition in response to the TRIGGER command input. In the latter case, the mode control element 120 is a 'passive' element and a determination of operational mode is made by the device 101 and not by an active change in the apparatus 100.

While in the trigger mode, the power supply 140 is preferably electrically isolated from the AC adaptor port 110 by the mode control element 120. The mode control element 120 preferably isolates the AC adaptor port 110 from the power supply 140 to prevent the power supply 140 from interfering with the received signal S and thus interfering with the event driven triggering of the device 101.

The signal S received by the AC adaptor port is interpreted to be a trigger source signal $S_{event}$. The event monitor 130 monitors the trigger source signal $S_{event}$ for the signal parameter(s) indicating the occurrence of a predefined event. For example, the predefined event may be a particular analog voltage level $V_1$ produced by a temperature sensor corresponding to a particular temperature $T_1$. In this example, the event monitor 130 monitors the signal $S_{event}$ for an occurrence of the voltage level $V_1$. In another example, the predefined event may be the occurrence of a voltage transition $V_t$ from a first voltage level $V_a$ to a second voltage level $V_b$, such as may be encountered for a digital signal. For example, a transition might be a result of a closing or an opening of a contact switch. In this other example, the event monitor 130 monitors the signal $S_{event}$ for an occurrence of the voltage transition $V_t$.

In all cases, the event monitor 130 preferably monitors the signal $S_{event}$ for a parameter value that satisfies a given condition relative to a threshold value. The condition can be that the parameter value is either greater than, less than, and/or equal to a particular threshold value. The choice of a specific threshold and a particular condition depends on a specific application. One skilled in the art could readily determine a threshold and a suitable condition given a specific application of the present invention.

While in the non trigger mode, the mode control element 120 electrically connects the AC adaptor port 110 to the power supply 140 and the signal S received by the AC adaptor port 110 is a power signal $S_{power}$. The power signal $S_{power}$ is used by the power supply to power the device 101 and/or to charge the battery 150. The event monitor 130 may be used to monitor a condition of power signal $S_{power}$, such as voltage and/or current, while the apparatus 100 is in the non trigger mode. However, the event monitor 130 does not trigger the device 101 while in the non trigger mode.

The AC adaptor port 110 is a conventional port used to accept power from an external power source. The mode control element 120 can be any device or circuit that can isolate the AC adaptor port 110 from the power supply 140. For example, the mode control element 120 can be a diode that prevents flow of electric current from the power supply 140 to the AC adaptor port 110. A diode is an example of a passive mode control element 120. Preferably, the mode control element 120 is a switch or an equivalent device that creates and maintains an electrical connection in the absence of the TRIGGER command. For example, a single pole single throw (SPST) switch can be used for the mode control element 120. The SPST switch has a control input for receiving the TRIGGER command. The SPST switch, when in a 'closed' condition, provides an electrical connection between an input of the switch to an output of the switch. On the other hand, the input is isolated from the output when the SPST switch is in an 'open' condition. The TRIGGER command can be used to open the switch. One skilled in the art is familiar with SPST switches and can readily come up with other suitable devices for realizing the mode control element 120.

The event monitor 130 preferably comprises an analog to digital converter (ADC). A variety of ADCs are known in the art each with their own particular advantages and disadvantages. ADCs suitable for the event monitor 130 of the present invention include, but are not limited to, over-sampling converters such as delta-sigma modulator-based ADCs, a successive approximation ADCs, and a so-called flash ADCs. Alternatively, the event monitor 130 comprises a comparator or a comparator combined with a digital to analog converter (DAC). The comparator compares the signal $S_{event}$ with a reference signal $S_{ref}$ and generates an output based on the comparison. The DAC is used to generate the reference signal $S_{ref}$. One skilled in the art is familiar with ADCs, comparators and DAC/comparator combinations and their operation. The choice of an appropriate ADC, comparator, DAC/comparator combination or other suitable components for monitoring events in a particular application and for a given signal $S_{event}$ would be readily apparent to one of ordinary skill in the art without undue experimentation and is within the scope of the present invention.

Figure 2:
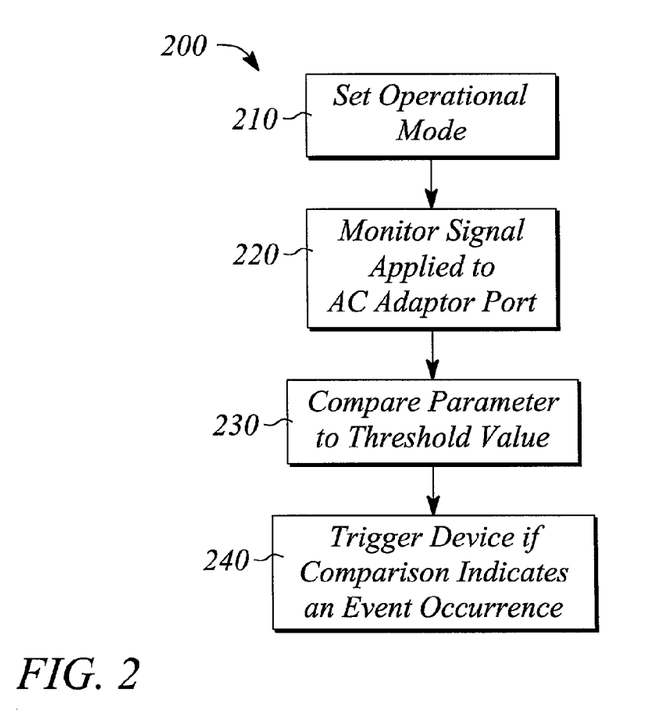
FIG. 2 illustrates a flowchart of a method of triggering a device according to the present invention.

In another aspect of the present invention, a method 200 of triggering a device having a power or AC adaptor port is provided. A flowchart of the method 200 of triggering is illustrated in FIG. 2. The method 200 of triggering comprises the step of setting 210 a mode of operation. The step of setting 210 establishes whether or not a trigger mode is enabled. The trigger mode can be enabled or disabled or equivalently, the device can be placed in the trigger mode or a non trigger mode during the step of setting 210. In the trigger mode (i.e., when the trigger mode is enabled), the AC adaptor port becomes or serves as a trigger source interface port and ceases to function as a conventional power supply port. Thus, the present method 200 establishes a novel dual role for the AC adaptor port as a trigger source interface port, as well as the power supply port, depending on the mode of operation that is set in the step of setting 210.

If trigger mode is enabled in the step of setting 210, the method 200 of triggering further comprises the step of monitoring 220 an event signal $S_{event}$ applied to the AC adaptor port. During the step of monitoring 220, a parameter of the signal $S_{event}$ is monitored 320. For example, a voltage $V_{signal}$, a current $I_{signal}$, or frequency $f_{signal}$ of the signal $S_{event}$ may be monitored 220.

The method 200 further comprises the step of comparing 230 the monitored 220 parameter to a predefined threshold value. The step of comparing 230 compares the monitored parameter to the threshold value to determine if the monitored parameter meets a predefined condition, such as either 'greater than', 'less than', and/or 'equal to' the threshold value. For example, the threshold value might be $V_{threshold}$=3.52 volts. The step of comparing 230 determines if the voltage $V_{signal}$ of the signal $S_{event}$ is greater than, less than or equal to $V_{threshold}$=3.52 volts.

The method 200 further comprises the step of triggering 240 the device if the specific, predefined condition of the step of comparing 230 occurs. For example, the predefined condition may be that the monitored parameter is less than the threshold value. In this case, the step of triggering 240 triggers the device when the step of comparing 230 determines that the monitored parameter is less than the threshold value.

Returning to the example above, assume that the predefined condition is that the signal voltage $V_{signal}$ is 'greater than' the threshold voltage $V_{threshold}$=3.52 volts. Thus, when the step of comparing 230 determines that the signal voltage $V_{signal}$ is greater than 3.52 volts, the step of triggering 240 triggers the device. The triggered device then performs an action, such as a digital camera recording an image, for example. In another example, the predefined condition might be that the monitored parameter (e.g., $V_{signal}$) is equal to or less than the respective threshold value (e.g. 3.52 volts). Thus, when the step of comparing 240 determines that the monitored parameter is less than the threshold value (e.g. $V_{signal} \leq 3.52$ volts), the step of triggering 240 triggers the device.

Figure 3:
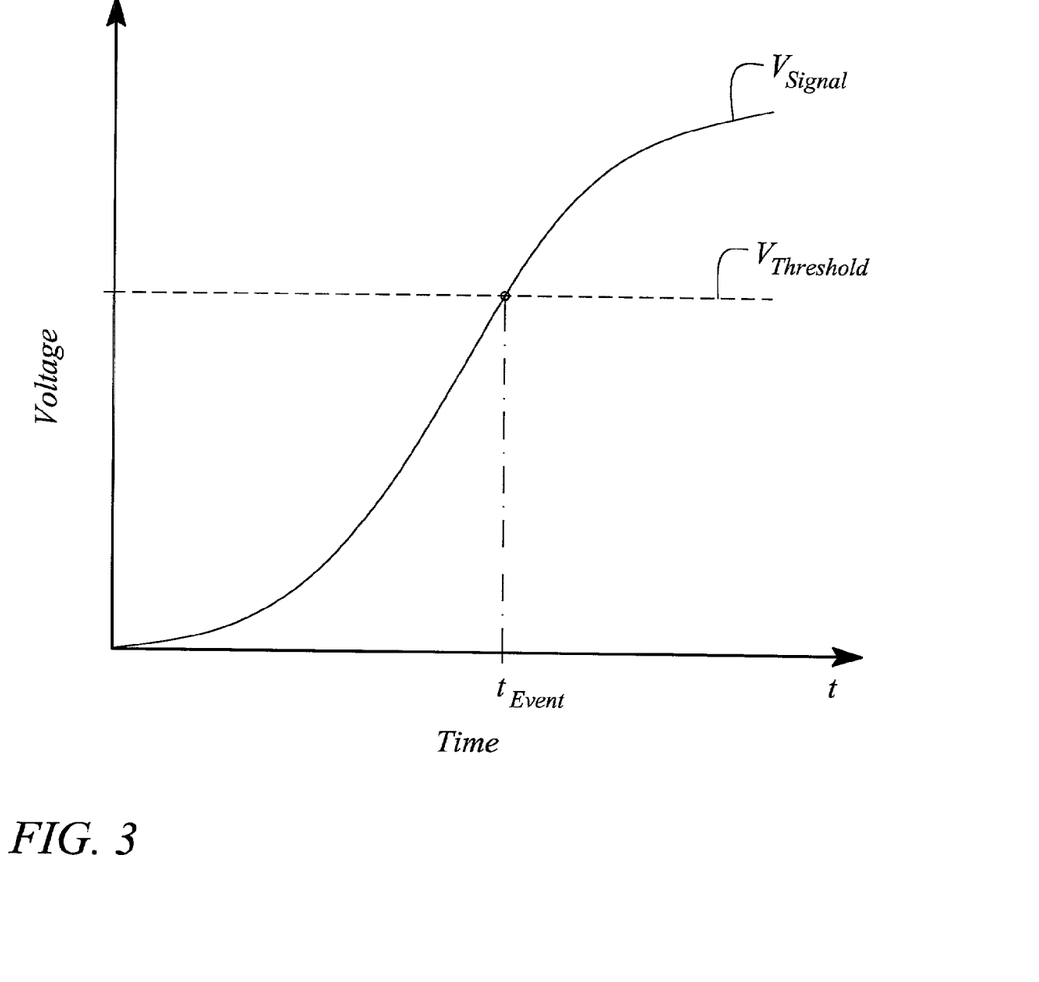
FIG. 3 illustrates a graph of a voltage waveform that triggers a device.

FIG. 3 illustrates a graph of an example signal parameter $V_{signal}$ representing a voltage of the event signal $S_{event}$ as a function of time t, wherein the event signal $S_{event}$ is applied to the AC adaptor port of the device. A 'dashed' horizontal line in the graph illustrated in FIG. 3 depicts a voltage threshold value $V_{threshold}$. If the condition for triggering 240 is that the signal voltage $V_{signal}$ must exceed the threshold value $V_{threshold}$ then the method 200 triggers the device at time $t_{event}$ if the mode is set to trigger mode in the step of setting 210. However, if the operational mode is not set to trigger mode in the step of setting 210, the AC adaptor port of the device will continue to function conventionally as a port to receive power to drive the device or charge/recharge the batteries in the device.

Note that many conventional digital cameras and other devices having an AC adaptor port already provide a means, such as an ADC, to monitor the voltage or other parameters of a signal applied to the port. For example, the ADC may be used to monitor a power signal $S_{power}$ applied to the AC adaptor port and/or may monitor a charge condition of the batteries. The power signal $S_{power}$ is applied to the AC adaptor port for the sole purposes of supplying power to the device and/or charging rechargeable batteries in these conventional situations.

Advantageously and unexpectedly, the method 200 can be implemented as a firmware or software upgrade to an existing device when an ADC or equivalent device is available for monitoring 220 a signal applied to the AC adaptor port. The upgraded firmware merely adds the functionality of the method 200 of the invention, thereby allowing the signal applied the AC adaptor port to be interpreted as either the event signal $S_{event}$ or the power signal $S_{power}$ depending on which mode is set 210. The firmware upgrade also enables the AC adaptor port to perform in a dual role as a trigger source interface port and as an AC adaptor port. The present invention extends the usefulness of the device to include performing a function automatically, without the user being present and without the user manually triggering the device to perform the function. Thus the present invention has uses in many types of research, manufacturing, testing and monitoring applications, where manual triggering of the device is not possible or convenient.

In yet another aspect of the present invention, an electronic device 300 that uses its AC adaptor port as both a power source port and an interface port for triggering device operation is provided. Solely to facilitate further discussion, the electronic device 300 is described below with reference to digital cameras. However, this description of the electronic device 300 as a digital camera is one preferred application and in no way is intended to limit the scope of the present invention. One of ordinary skill in the art can readily extend the discussion hereinbelow regarding the digital camera to any electronic device having an AC adapter port.

Figure 4:
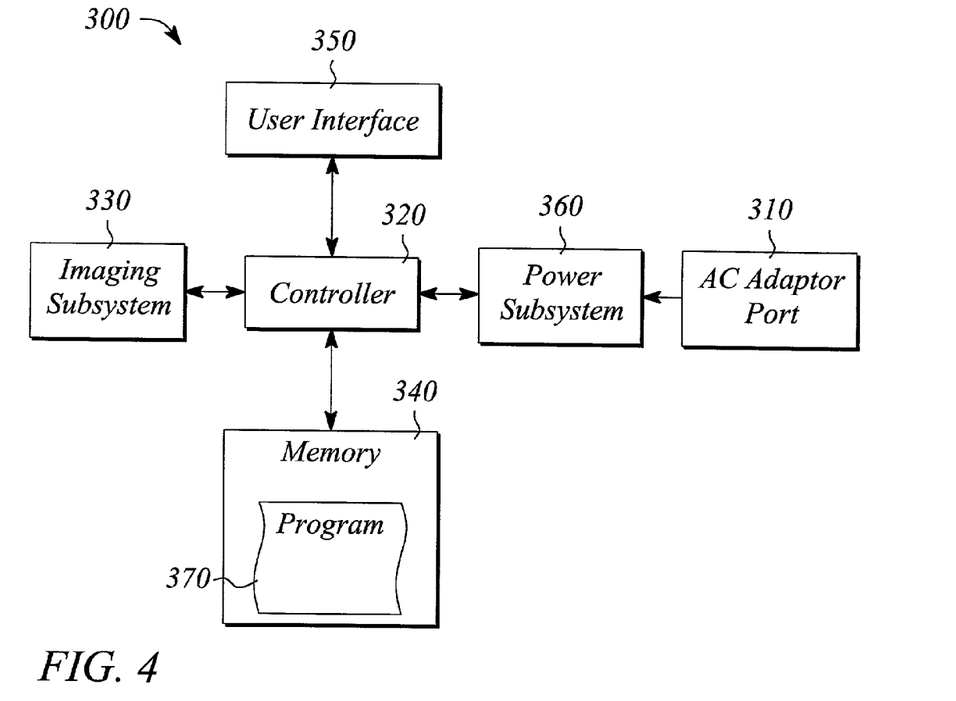
FIG. 4 illustrates a block diagram of a triggerable device according to the present invention in a preferred embodiment as a digital camera.

FIG. 4 illustrates a block diagram of the electronic device 300 of the present invention in the form of a digital camera that is triggered to perform an image recording operation by an external event. Recall that the digital camera 300 is representative of any triggerable electronic device. The digital camera 300 having an AC adaptor port 310 comprises a controller 320, an imaging subsystem 330, a memory subsystem 340, an interface subsystem 350, a power subsystem 360, and a control program 370 stored in the memory subsystem 340. The controller 320 executes the control program 370 and controls the operation of the subsystems 330, 340, 350, 360 of the digital camera 300.

The controller 320 can be any sort of component or group of components capable of providing control and coordination of the subsystems 330, 340, 350, and 360. For example, the controller 320 can be a microprocessor or microcontroller. Alternatively, the controller 320 can be implemented as an application specific integrated circuit (ASIC) or even an assemblage of discrete components. The controller 320 is interfaced to the imaging subsystem 330, the memory subsystem 340, the interface subsystem 350, and the power subsystem 360. In some implementations, a portion of the memory subsystem 340 may be combined with the controller 320.

In a preferred embodiment, the controller 320 comprises a microprocessor and a microcontroller. The microcontroller has much lower power consumption than the microprocessor and is used to implement low power level tasks, such as monitoring button presses and implementing a real-time clock function of the digital camera 300. The microcontroller is primarily responsible for controller 320 functionality that occurs while the digital camera 300 is in 'stand-by' or 'shut-down' mode. The microcontroller executes a simple computer program. Preferably the simple computer program is stored as firmware in read-only memory (ROM), the ROM preferably being built into the microcontroller.

On the other hand, the microprocessor implements the balance of the controller-related functionality. In particular, the microprocessor is responsible for all of the computationally intensive tasks of the controller 320, including but not limited to, image formatting, file management, and digital input/output formatting. In the preferred embodiment, the microprocessor executes the control program 370 that implements the method 200 of the present invention.

Figure 5:
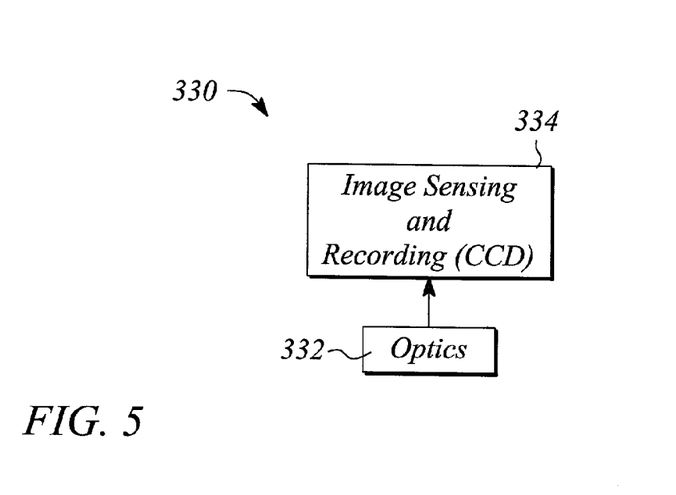
FIG. 5 illustrates a block diagram of an imaging subsystem of the digital camera in FIG. 4.

FIG. 5 illustrates a block diagram of the imaging subsystem 330 of the digital camera 300. The imaging subsystem comprises optics 332 and an image sensing and recording 334 portion. The sensing and recording 334 portion preferably comprises a charge coupled device (CCD) array. During operation of the camera 300, the optics 332 project an optical image onto an image plane of the image sensing and recording 334 portion of the imaging system 330. The optics 332 may provide either variable or fixed focusing, as well as optical zoom (i.e. variable optical magnification) functionality. The optical image, once focused, is captured and digitized by the image sensing and recording 334 portion of the imaging subsystem 330. Digitizing produces a digital image. The controller 320 controls the image capturing, the focusing and the zooming functions of the imaging subsystem 330. When the controller 320 initiates the action of capturing of an image, the imaging subsystem 330 digitizes and records the image. The digital image is then transferred to and stored in the memory subsystem 330.

The memory subsystem 340 comprises computer memory for storing digital images, as well as for storing the control program 370. Preferably, the memory subsystem 340 comprises a combination of read only memory (ROM) and random access memory (RAM). The ROM is used to store the control program 370, while the RAM is used to store digital images from the imaging subsystem 330. The memory subsystem 340 may also store a directory of the images and/or a directory of stored computer programs therein, including the control program 370.

Figure 6:
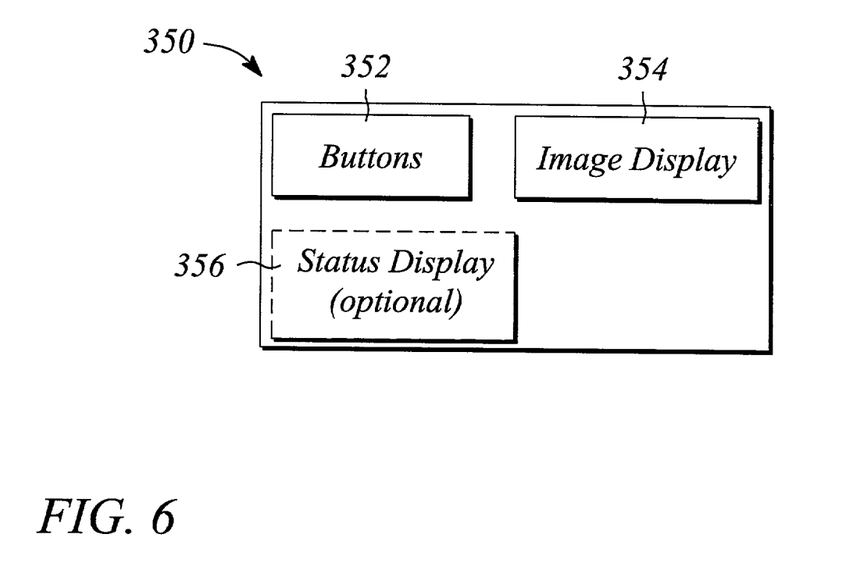
FIG. 6 illustrates a block diagram of a user interface of the digital camera of FIG. 4.

A block diagram of the interface subsystem 350 is illustrated in FIG. 6. The interface subsystem 350 comprises buttons 352 used by a user to interact with the control program 370 executed by the controller 320, thereby affecting user initiated control of the digital camera 300. For example, a button 352' may enable the user to initiate an image recording (i.e., 'snap a picture'). Another button 352" may function as an ON/OFF switch, allowing the camera to be turned ON or OFF. Additionally, the buttons 352 can act as 'arrow' keys to allow a value to be incrementally controlled, or enable the user to navigate a menu and make selections. One skilled in the art is familiar with buttons 352 used to provide user interface to a digital camera 300.

The interface subsystem 350 further comprises an image display 354. The image display 354 enables the user to view a digital image stored in the memory subsystem 340. In addition, the image display 354 can provide a 'real-time' view of the image incident on the image sensing and recording 334 portion of the imaging system 330. In addition to viewing images, the image display 354 provides a means for displaying menus allowing the user to select various operational modes, including the trigger mode described herein with respect to the present invention, and directories allowing the user to view and manipulate the contents of the memory subsystem 340. The image display 354 is typically a liquid crystal (LCD) display or similar display useful for displaying digital images.

The interface subsystem 350 further comprises an optional status display 356. The optional status display 356 provides ancillary information regarding the operational status of the digital camera 300. The status display 356 helps to reduce the 'visual clutter' of the image display 354. For example, the status display 356 might be used to display a fuel gauge that estimates power remaining in a battery. In addition, the status display 356 can be used to display to the user operational mode information, such as whether or not the digital camera 300 is in 'trigger mode', or is 'ON' or 'OFF'. Typically, the status display 356 is an LCD display, although is a much less complex LCD display than that used for the image display 354.

Figure 7:
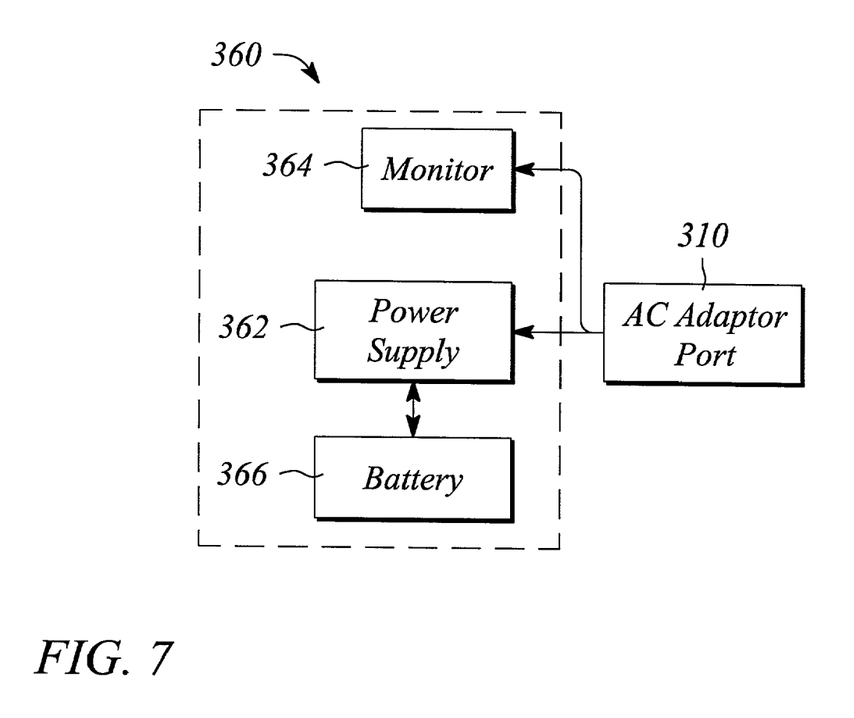
FIG. 7 illustrates a block diagram of a power supply subsystem of the digital camera of FIG. 4.

The power subsystem 360 is illustrated in FIG. 7. The power supply subsystem comprises a power supply 362, a monitor 364, and a battery 366. The power supply 362 has an input connected to the AC adaptor port 310 and an output that provides power to the rest of the digital camera 300. The power supply 362 conditions and voltage-converts a power signal $S_{power}$ applied to its input so that the power signal $S_{power}$ can be used by the digital camera 300. In addition, the power supply 362 has a connection to the battery 366. The power supply 362 can draw power from or supply power to the battery 366 using this connection. When supplying power to the battery 366, the power supply 362 is said to be charging the battery 366. When drawing power from the battery 366, the camera 300 is said to be battery powered. In general, the camera 300 operates off of power supplied by the battery 366 only when the power signal $S_{power}$ is not applied to the AC adaptor port 310. Using battery power is typical for many portable applications of the digital camera, where AC power is not readily available or convenient to use when operating the camera.

The monitor 364 is connected to the AC adaptor port 310. The monitor 364 measures a parameter or parameters of a signal applied to the AC adaptor port 310 and communicates the measured parameter to the controller 320. In the preferred embodiment, the monitor 364 is an analog to digital converter (ADC) and the parameter monitored is a voltage of a signal applied to the AC adaptor port 310. In some applications, the ADC is a multi-channel ADC that monitors voltages at other points in the camera 300 in addition to the signal voltage at the AC adaptor port 310.

Preferably, the power supply 362 can electrically isolate the input connected to the AC adaptor port 310, thereby enabling the camera 300 to operate in the absence of power applied to the AC adaptor port (i.e., using battery power). More preferably, the power supply 362 uses a switch to electrically disconnect and isolate its adaptor port input upon receipt of a command from the controller 320. Such a command could be a TRIGGER mode command. In terms of the apparatus 100 of the present invention, the power supply 362 combines the functionality of the mode control element 120 and the power supply 140.

The control program 370 implements a control algorithm that coordinates and controls the actions and operations of the subsystems 330, 340, 350, and 360. In particular, the control program 370 defines the operational meaning of the buttons 352 and generates and formats data displayed on the image display 354 and the optional status display 356; initiates image capturing and recording by the imaging subsystem 330; and implements data file storage and recovery by the memory subsystem 340. In short, the control program 370, in a first or conventional portion, implements a control algorithm that accomplishes all of the tasks necessary for conventional operation of the digital camera 300. The control program 370 is stored in the memory subsystem 340 and is generally referred to as the firmware of the digital camera 300. One skilled in the art is familiar with such digital camera 300 firmware. In particular, one skilled in the art can create digital camera 300 firmware that implements the conventional portion of the control program 370 without undue experimentation using conventional computer programming techniques.

In addition to the conventional portion providing for conventional operational functionality, the control program 370 comprises a trigger mode portion that essentially implements the method 200 of triggering according to the invention. Specifically, the trigger mode portion of the control program 370 provides a user with an interface enabling the user to set the mode of the digital camera 300 as either trigger mode or non trigger mode. As part of the mode setting functionality of the trigger mode portion, the user can employ the interface to set the threshold value and comparison condition (e.g. less than, greater than, and/or equal). For example, the interface can be a menu item displayed on the image display 354 of the interface subsystem 350. Using 'arrow keys' and a 'select' or 'enter' button provided by the buttons 352 of the interface subsystem 350, the user can choose the mode (e.g. trigger mode enable or disable), choose the comparison condition, and/or set a threshold value. Alternatively, trigger mode can be set using an optional toggle button 358 (not shown) that is part of the interface subsystem 350. If the monitor 364 is capable of monitoring several signal parameters simultaneously, the user can select and set several comparison conditions and several respective threshold values.

Once set in trigger mode (i.e., trigger mode is enabled), the control program 370 receives a signal from the monitor 364 of the power subsystem 360 and compares the signal to the threshold value according to the condition that has been set. When the condition is met, the control program 370 recognizes the detection of a trigger event. Following the detection of the trigger event, the control program 370 initiates action by the camera 300, such as an image capturing and recording action. Given the discussion hereinabove, one skilled in the art can implement such a trigger mode portion of the control program 370 without undue experimentation using conventional computer programming techniques. Advantageously, such a trigger mode portion of the control program 370 may be implemented as a firmware upgrade to existing digital camera 300 firmware.

Figure 8A:
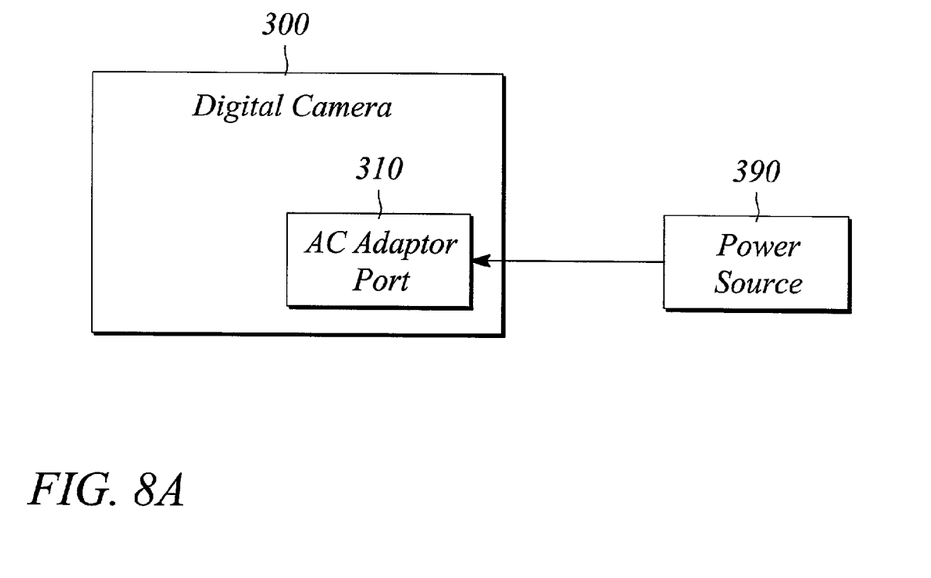
FIG. 8A illustrates the digital camera device according to the preferred embodiment of the present invention illustrated in FIG. 4 connected to an external power source used to charge re-chargeable batteries of the power supply subsystem.

FIG. 8A illustrates the digital camera 300 of the present invention connected via the AC adaptor port 310 to an external power source 390 used to charge rechargeable batteries of the power subsystem 360. The configuration illustrated in FIG. 8A is representative of how the camera 300 is connected to receive power to charge the battery 366, for example, when trigger mode is disabled. The configuration illustrated in FIG. 8A represents both the conventional and sole use of the AC adaptor port 310 of a conventional digital camera, and one of the uses of the AC adaptor port 310 of the digital camera 300 of the present invention.

Figure 8B:
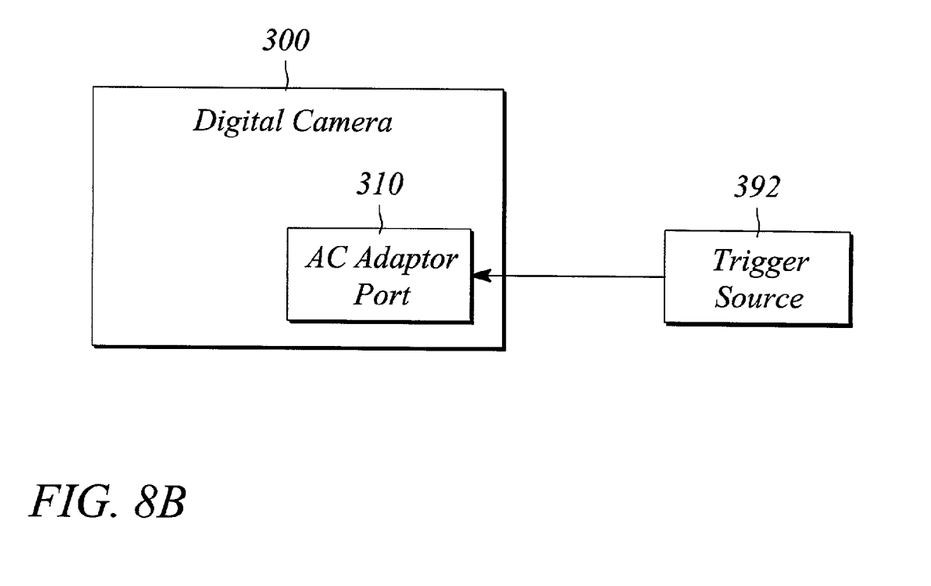
FIG. 8B illustrates the digital camera device according to the preferred embodiment of the present invention illustrated in FIG. 4 connected to an external trigger source that triggers an image recording.

FIG. 8B illustrates the digital camera 300 of the present invention connected via the AC adaptor port 310 to an external trigger source 392 that can trigger an image recording operation for example, when the camera 300 is in trigger mode. The external trigger source 392 is connected to the AC adaptor port 310 according to the present invention. The configuration illustrated in FIG. 8B is representative of how the AC adaptor port 310 is used as a trigger source interface port while in trigger mode. The configurations of FIGS. 8A and 8B are illustrative of the novel AC adaptor port 310 dual-use capability afforded by the present invention.

Thus there have been described an apparatus 100 for triggering a triggerable device 101 and a method 200 of triggering the device 101 both of which use the AC adaptor port as a trigger source interface port. In addition, an electronic device 300 that uses an AC adaptor port as both a trigger source interface port and the conventional power supply port has been described. It should be understood that the above-described embodiments are merely illustrative of the some of the many specific embodiments that represent the principles of the present invention. Clearly, those skilled in the art can readily devise numerous other arrangements without departing from the scope of the present invention. For example, it is within the scope of the present invention that the apparatus 100, the method 200, and the electronic device 300 include an event trigger signal that is provided via a wire or an optical fiber connection, for example, or provided relatively remotely using a radio frequency (RF) signal, an infrared (IR) signal or using other wireless inductive coupled communications techniques.

What is claimed is:

1. An apparatus for triggering an electronic device and for receiving power for the device comprising:
    an AC adaptor port that receives a signal;
    a mode control element having an input connected to the AC adaptor port, the mode control element receives the signal from the AC adaptor port; and
    an event monitor connected to the AC adaptor port that monitors the signal for a signal event,
    wherein the signal is a power signal when produced by an external power source, and wherein the signal is an event signal when produced by an external trigger source, such that the event monitor triggers the device upon detection of the signal event.

2. The apparatus of claim 1 further comprising a power supply connected to an output of the mode control element, wherein in a first mode, the mode control element communicates the power signal to the power supply, and wherein in a second mode, the mode control element isolates the power supply from the AC adaptor port.

3. The apparatus of claim 2, further comprising a battery connected to the power supply, wherein in the first mode, the power supply charges the battery with the power signal, and wherein in second mode, the power supply draws power from the battery.

4. The apparatus of claim 1 wherein the external trigger source is a sensor.

5. The apparatus of claim 1 wherein the event monitor monitors a parameter of the signal and in the second mode, the event monitor compares the parameter value to a threshold value to determine an occurrence of the signal event.

6. The apparatus of claim 5, wherein the parameter is a voltage of the signal and the threshold value is a predefined threshold voltage.

7. The apparatus of claim 5, wherein the parameter is a voltage transition in the signal and the threshold value is a predefined transition voltage.

8. The apparatus of claim 1, wherein the event monitor is an analog to digital converter that digitizes a parameter of the signal and communicates the digitized parameter to the device, and wherein the device compares the digitized parameter to a threshold value and determines whether the signal event has occurred, such that upon detection of the signal event, the device performs an action.

9. An apparatus for triggering an electronic device, the apparatus having a first operational mode and an independent second operational mode, the apparatus comprising:
an AC adaptor port that accepts power from an external power source while the apparatus is in the first operational mode, and that accepts a signal from an external trigger source while the apparatus is in the second operational mode, such that the AC adaptor port is an interface port for the electronic device and the external trigger source.

10. The apparatus of claim 9, wherein the apparatus further comprises:
a mode control element connected to the AC adaptor/trigger interface port; and
an event monitor connected to the AC adaptor/trigger interface port,
wherein while the apparatus is in the second mode, the event monitor monitors a parameter of the signal applied to the AC adaptor/trigger interface port for a signal event occurrence, and wherein the apparatus triggers the device upon detecting the occurrence.

11. An AC adaptor port apparatus for an electronic device comprising:
a first operational mode, wherein the apparatus accepts power from an external power source for the electronic device; and
an independent second operational mode, wherein the apparatus acts as a trigger source interface port that accepts and processes a signal from an external trigger source for triggering an action by the electronic device.

12. The apparatus of claim 11, wherein the apparatus further comprises:
a mode control element connected to the AC adaptor/trigger interface port; and
an event monitor connected to the AC adaptor/trigger interface port,
wherein while the apparatus is in the second mode, the event monitor monitors a parameter of the signal applied to the AC adaptor/trigger interface port for a signal event occurrence, and wherein the apparatus triggers the device upon detecting the occurrence.

13. A method of triggering an electronic device that has an AC adaptor port for receiving power from a power source, the method comprising the steps of:
setting a mode of operation for the device, wherein the mode of operation is either trigger mode or non trigger mode; and
while the trigger mode is set, the method further comprises the steps of:
monitoring a parameter of a signal applied to the AC adaptor port;
comparing the parameter to a threshold according to a predefined comparison condition to determine if a signal event has occurred; and
triggering the device upon detection of the signal event.

14. The method of claim 13 wherein in the step of comparing, the comparison condition is whether the parameter is greater than, less than, and/or equal to the threshold, or a transition from the threshold.

15. The method of claim 13 wherein the parameter is one or more of a voltage, a current, and a frequency of the signal.

16. The method of claim 13 wherein the step of setting the mode further comprises the steps of:
establishing an external trigger source to produce the signal that is applied to the AC adaptor port;
selecting a comparison condition; and
setting a threshold value.

17. A method of triggering an electronic device to perform an action at a location remote to a user of the device, the device having an AC adaptor port, the method comprising the steps of:
setting an operational mode for the device to either a trigger mode or a non trigger mode, wherein in non trigger mode, the AC adaptor port serves as a power supply port and receives a power signal, and wherein in the trigger mode, the AC adaptor port serves as a trigger source interface port and receives a signal from an external trigger source; and
triggering the device to perform the action when a predefined signal event occurs in the signal from the external trigger source and the operational mode is set to trigger mode.

18. The method of claim 17, further comprising the steps of establishing the external trigger source; and defining the signal event to trigger the device before the step of triggering.

19. An electronic device having an AC adaptor port comprising:
a first operational mode where the AC adaptor port receives a power signal from an external power source; and
a second operational mode where the AC adaptor port receives a signal from an external event trigger source, such that upon an occurrence of a predefined signal event, the second mode will trigger the device to perform an action.

20. The electronic device of claim 19, wherein the second operational mode comprises:
a mode control element connected to the AC adaptor port that prevents the device from receiving the power signal at the AC adaptor port; and
an event monitor connected to the AC adaptor port that monitors the external event trigger signal for the occurrence of the signal event.

21. The electronic device of claim 19, wherein the external event trigger source and the device are remotely located to a user of the device.

22. An electronic device that is triggerable by an external event trigger source and having a first mode and a second mode, the device comprising:
an AC adaptor port, the AC adaptor port providing power to the device while the device is in the first mode, and the AC adaptor port providing an event trigger interface port while the device is in the second mode.

23. The device of claim 22 wherein the device is a digital camera.

24. The device of claim 23, wherein the digital camera comprises a control program stored in memory that provides the second mode of the camera.

25. The device of claim 24 wherein the digital camera further comprises:
a controller that controls the operation of the camera;
an imaging subsystem that captures and records an optical image and transforms the captured image into a digital image;
a memory subsystem that stores digital images in the memory;
a interface subsystem that provides a user interface for the digital camera; and
a power subsystem that provides power to the camera,
wherein the controller executes the control program, and wherein the control program further provides operational control and coordination of the imaging subsystem, the memory subsystem, the interface subsystem and the power subsystem.

26. A digital camera having a trigger mode that can be enabled and disabled, the digital camera comprising:
- an AC adaptor port;
- a controller that controls the operation of the camera;
- an imaging subsystem that captures and records an optical image and transforms the captured image into a digital image;
- a memory subsystem that stores digital images in memory;
- a interface subsystem that provides a user interface for the digital camera;
- a power subsystem that provides power to the camera; and
- a control program stored in the memory subsystem that when executed by the controller provides operational control and coordination of the subsystems,
- wherein while the trigger mode is enabled, the AC adaptor port is a trigger source interface port, such that an event signal applied to the interface port can trigger an image recording action by the camera, and wherein while the trigger mode is disabled, the AC adaptor port is a power supply port, such that a power signal applied to the supply port supplies operational power to the power subsystem.

27. The digital camera of claim 26, wherein the power subsystem comprises:
- a power supply connected to the AC adaptor port;
- a monitor connected to the AC adaptor port; and
- a battery connected to the power supply,
- wherein while the trigger mode is enabled, the power supply is electrically isolated from the AC adaptor port and the power supply draws power from the battery, and wherein while the trigger mode is disabled, the power supply can draw power from the AC adaptor port.

28. The digital camera of claim 27, wherein while the trigger mode is enabled, the event signal applied to the AC adaptor port is monitored by the monitor for the occurrence of a signal event, and wherein upon detection of the signal event, the controller triggers the camera.

29. The digital camera of claim 27, wherein while the trigger mode is disabled, the power that can be drawn from the AC adaptor port charges the battery.

* * * * *